United States Patent [19]

Clark

[11] Patent Number: 5,385,488

[45] Date of Patent: Jan. 31, 1995

[54] PATCH PANEL

[75] Inventor: Gordon P. F. Clark, Beaconsfield, Canada

[73] Assignee: Northern Telecom Limited, Montreal, Canada

[21] Appl. No.: 6,410

[22] Filed: Jan. 21, 1993

[51] Int. Cl.⁶ .................................. H01R 13/74
[52] U.S. Cl. ................................. 439/557; 439/571
[58] Field of Search ............... 439/535, 536, 540, 544, 439/545, 550, 552, 557, 567, 571

[56] References Cited

U.S. PATENT DOCUMENTS

| | | | |
|---|---|---|---|
| 4,722,136 | 2/1988 | Justiano et al. | 439/557 X |
| 4,725,249 | 2/1988 | Blackwood et al. | 439/535 |
| 5,044,981 | 9/1991 | Suffi et al. | 439/676 X |
| 5,106,325 | 4/1992 | Robinson et al. | 439/535 X |
| 5,118,311 | 6/1992 | Margini | 439/676 |
| 5,173,061 | 12/1992 | Comerci et al. | 439/536 |

FOREIGN PATENT DOCUMENTS

| | | | |
|---|---|---|---|
| 3734702 | 1/1989 | Germany | 439/540 |
| 2104735 | 3/1983 | United Kingdom | 439/557 |

Primary Examiner—Eugene F. Desmond
Attorney, Agent, or Firm—R. J. Austin

[57] ABSTRACT

A patch panel is disclosed which is easily expandable as required by a customer and which substantially simplifies conventional field servicing practices. The invention provides a patch panel comprising an assembly of at least one connector and printed circuit board with the connector being mounted upon the printed circuit board; a mount for removably supporting the assembly of at least one connector and printed circuit board in a desired location relative to the mount and a panel for detachably holding the mount in a predetermined position to the panel such that the panel prevents removal of the assembly of at least one connector and printed circuit board from the mount.

9 Claims, 3 Drawing Sheets

PATCH PANEL

This invention relates to patch panels.

In the telecommunications industry, conventional patch panels are available each of which has a plurality of connectors permanently mounted thereto. A customer thus is required to purchase a patch panel with all of the connectors mounted thereon whether or not all of the connectors are necessary for customer usage. The customer then utilizes the connectors that he requires for a given system of conductor wiring within his premises while leaving unused remaining connectors as spares and which may never be used unless they are eventually needed for possible wiring and terminal growth at a later date. Hence, the customer is forced to pay immediately for more equipment than he at least initially requires.

Field servicing or repairing of conventional patch panels usually requires the complete panel to be taken out of service and returned to the supplier thereby requiring a replacement patch panel and the connection of conductor wiring to existing telecommunications terminals. Thus if a single connector breaks or malfunctions, the customer is greatly inconvenienced.

The present invention seeks to provide a patch panel which minimizes the above problems.

According to one aspect of the invention there is provided a patch panel comprising an assembly of at least one connector and carrying means with the connector being mounted upon the carrying means; a mount for removably supporting the assembly of at least one connector and carrying means in a desired location relative to the mount; and a panel for detachably holding the mount in a predetermined position to the panel such that the panel prevents removal of the assembly from the mount.

In structures according to the invention the assembly of connector and carrying means is not held securely within the mount until the mount is held by the panel whereby the panel provides the dual function of holding the mount upon the panel and holding the assembly of connector and carrying means upon the mount. In addition and together with the detachable holding of the mount upon the panel and in the case of repair, the mount is firstly easily removed from the panel thereby enabling the mount and the assembly of connector and carrying means to be easily detached one from the other. The connector then may be quickly replaced by simply replacing the assembly of connector and carrying means.

Preferably latch means are provided to detachably hold the mount to the panel so that the installation and removal of the mount is easily accomplished without requiring tools. Alternatively, screw threaded means are used to detachably hold the mount to the panel.

In a preferred arrangement of a patch panel according to the invention the panel has a plurality of predetermined positions for receiving mounts, each mount removably supporting an assembly of connector and carrying means. Hence, a customer need only initially purchase the required number of these mounts and corresponding assemblies to suit his system of conductor wiring and telecommunication terminal requirements thereby allowing one or more of the predetermined positions to remain empty. These empty positions may be used for possible future use should he wish to expand his system of conductor wiring and increase the number of telecommunication terminals. This produces a modular concept with each mount and its corresponding assembly of connector and carrying means providing an individual module.

One embodiment of the invention will now be described, by way of example, with reference to the accompanying drawings in which.

Figure 1:
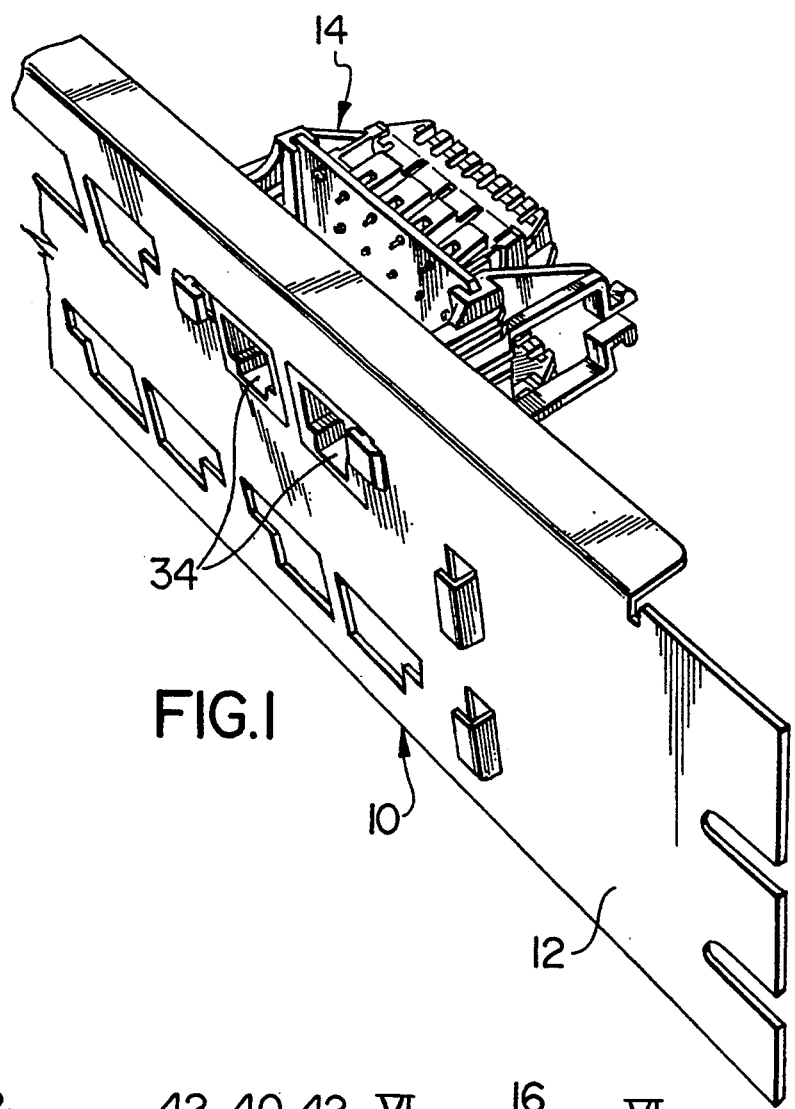
FIG. 1 is an isometric view of the front of one end region of a patch panel showing a module held in position on a panel.
Figure 2:
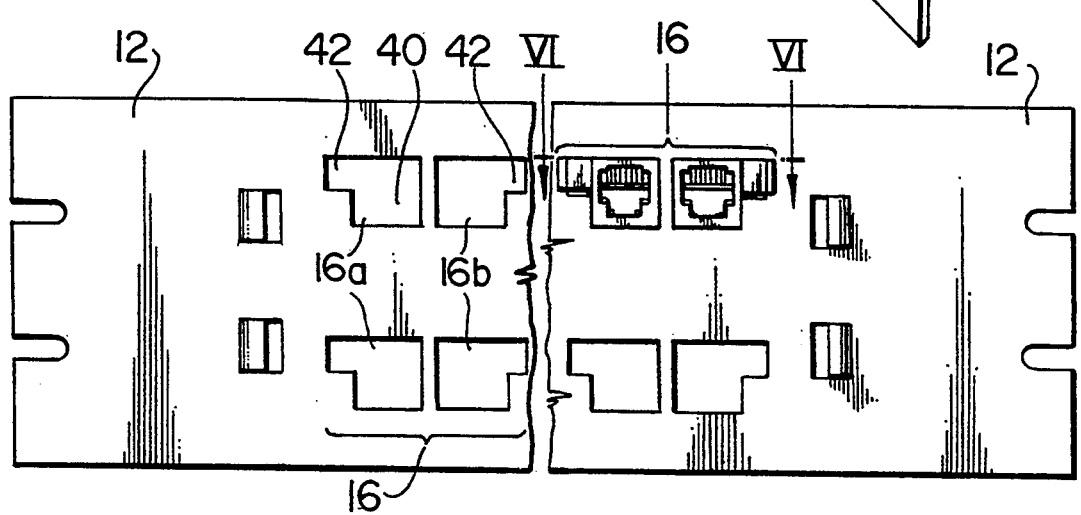
FIG. 2 is a front elevational view of the panel of the patch panel of FIG. 1.
Figure 3:
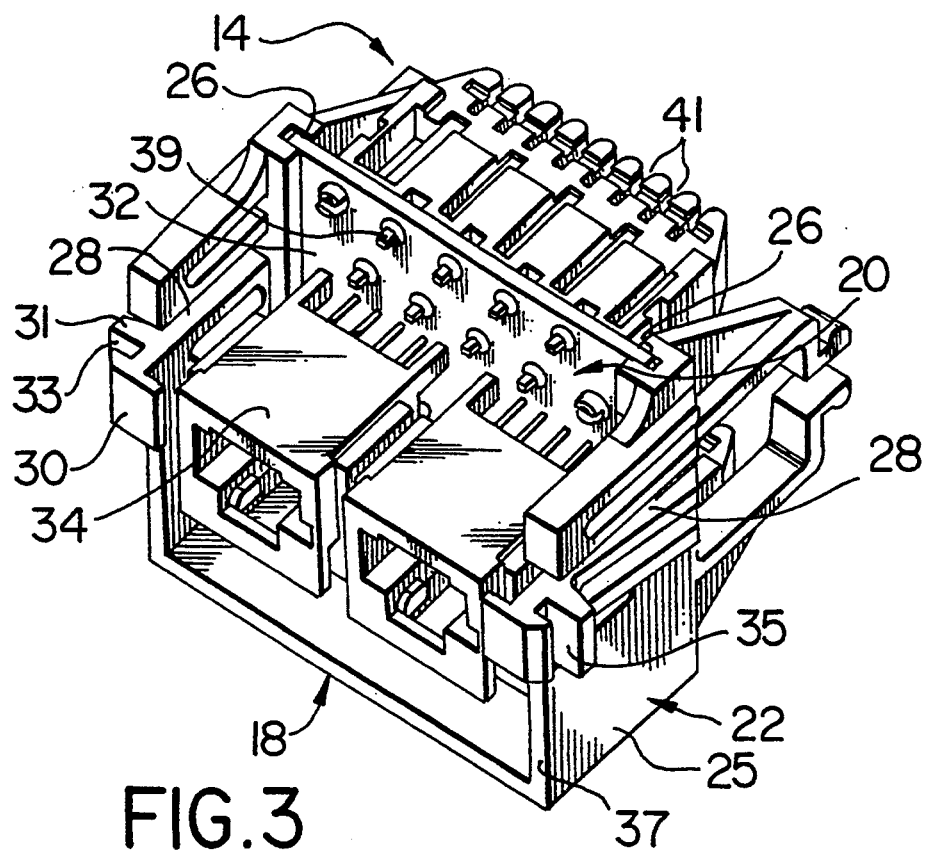
FIG. 3 is an isometric view of a single module which forms part of the patch panel shown in FIG. 1 and to a larger scale than FIG. 1 and showing a module in position.
Figure 4:
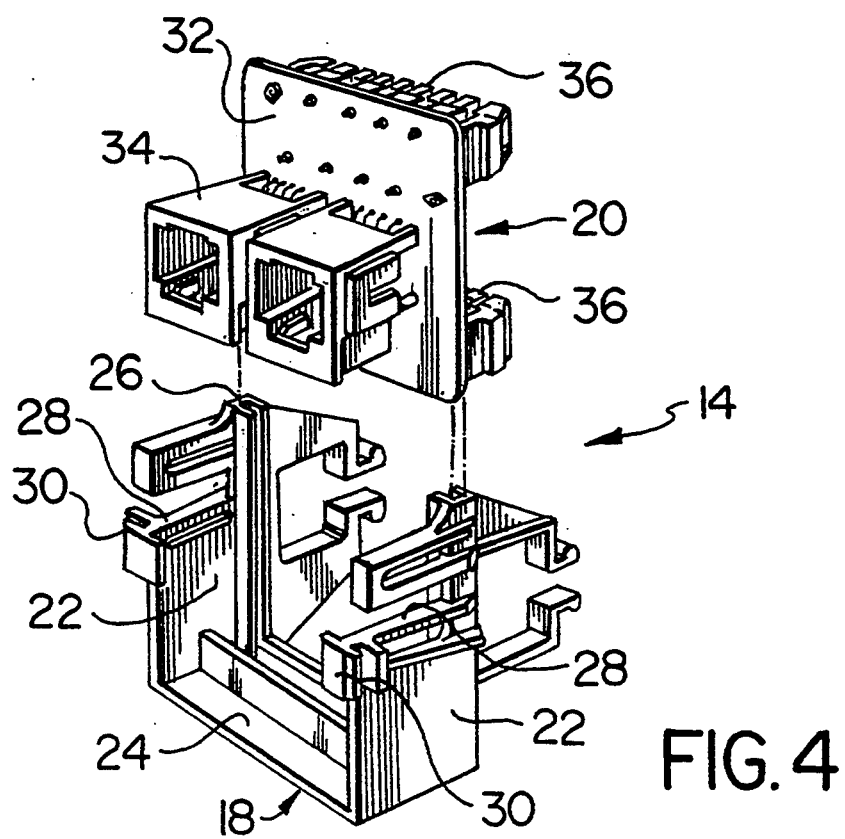
FIG. 4 is an exploded isometric view of the module in FIG. 3 from a different angle and to a smaller scale.

As shown in FIG. 1, in the embodiment, a patch panel 10 comprises a panel 12 for detachably holding a plurality of modules 14 in individual predetermined positions 16, (FIG. 2) upon the panel 12 as will be described. At each position 16 on the panel 12 a pair of apertures 16a and 16b is provided (FIG. 2). As may be seen the positions 16 lie in two rows one above the other with the positions 16 spaced horizontally apart in each row. Each aperture 16a, 16b is substantially square in front elevation view and has a small aperture extension 42 which extends horizontally outwards from the upper end of a vertical edge of the aperture, the two extensions being remote and extending away from each other in each aperture pair. As shown in FIG. 3 and 4 each module 14 comprises a mount 18 to which an assembly 20 of connector and carrying means is detachably supported before being assembled to the panel 12.

The mount 18 is substantially 'U' shaped and comprises two opposed arms 22 extending from a base 24. The arms 22 have substantially wide planar portions 25 and the base 24 is correspondingly wide. The mount 18 includes guide means for receiving the assembly 20. The guide means is provided at one side of each of the arm's planar portions 25 and is provided by two aligned, inwardly directed, and parallel guide channels 26 of the arms 22 which extend upwardly and beyond ends of the planar portions 25. The channels 26 have a width to slidably receive edges of a rectangular printed circuit board 32 (to be described) of the assembly 20.

Latch means is provided on the mount 18 for detachably holding the mount 18 to the panel 12. The latch means comprises two spaced apart resilient latches 28 disposed in a parallel relationship extending one from each of the structures of the channels 26 so as to lie alongside the planar portions 25 of the arms 22. Each latch 28 includes a latch head 30 at its outward end which lies beyond the planar portions 25 of the arms. Together with a flange 31 provided upon each latch 28, each latch head 30 defines a 'U' shaped slot 33, of a predetermined width, and the two slots 33 have their respective open ends facing directly away one from the other. The predetermined width of the slots 33 is such as to slidably receive the thickness of the panel 12. One surface 35 of each slot 33 (FIG. 3) is coplanar with an end surface 37 of the mount, the surface 37 formed by the base 24 and the planar portions 25.

Figure 5:
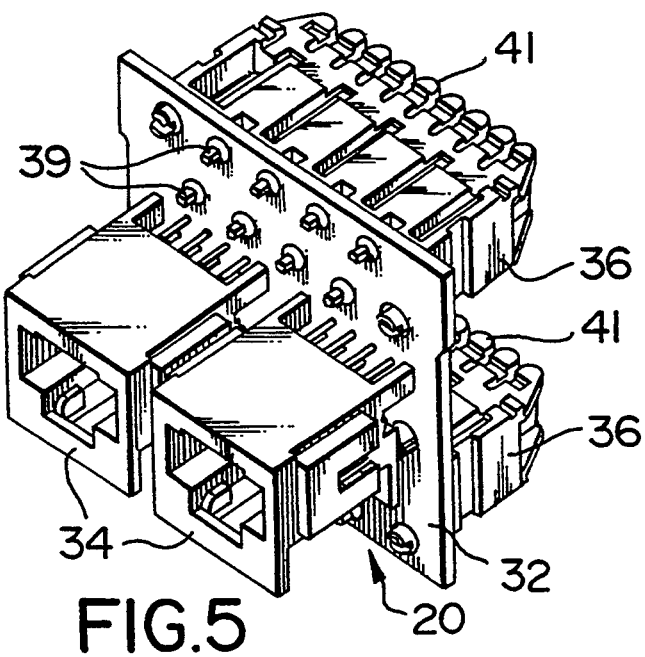
FIG. 5 is an isometric view of part of the module and viewed from the same angle as FIG. 3.

As can be seen from FIG. 4 and more clearly from FIG. 5 the assembly 20 of connector and carrying means comprises a carrying means in the form of the rectangular printed circuit board (PCB) 32 having two industry standard 8-position modular jack connectors 34 and two corresponding insulation displacement connectors 36 mounted thereon. The two insulation displacement connectors 36 are mounted on one planar surface of the PCB 32 and on one side have terminals 39 which are electrically connected through the PCB 32 to respective terminals of the modular jack connectors 34 which are mounted on the other planer surface of the PCB 32. On its other side, each connector 36 has a rectangular row of insulation displacement terminals 41, for receiving insulated conductor wires.

A module 14 is constructed by simply positioning an assembly 20 above a mount 18 such that the appropriate edges of the PCB 32 slide into the guide channels 26 on the mount 18 as is shown in FIG. 4 and until the PCB 32 engages the base 24 of the mount. The assembly 20 is then supported in a desired location relative to the mount 18. As may be seen from FIG. 3, the connectors 34 lie between the planar portions 25 of the arms and extend from the PCB 32 to a position such that a front surface of the modular jack connectors are aligned with the forward most surface of the 'U' shaped slots 33, i.e. those surfaces provided by the latch heads 30.

A module 14 is mounted onto one side of the panel 12 and in a desired predetermined position 16, by pressing the latch heads 30 through the associated small aperture extensions 42 (FIG. 1) such that the latch heads 30 engage the panel 12 with the panel 12 being within the slots 33.

Figure 6:
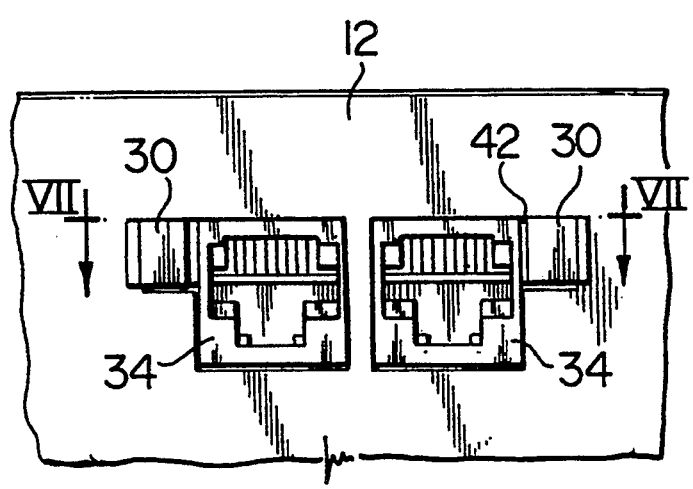
FIG. 6 is a view similar to FIG. 2 of a part of the panel and to a larger scale than FIG. 2.

The small aperture extensions 42 are of a size to permit the passage of the latch heads 30 through the panel 12 but once the latch heads 30 engage the panel 12, vertical movement of the mount 18 is inhibited by the width of the aperture extensions (FIG. 6).

Figure 7:
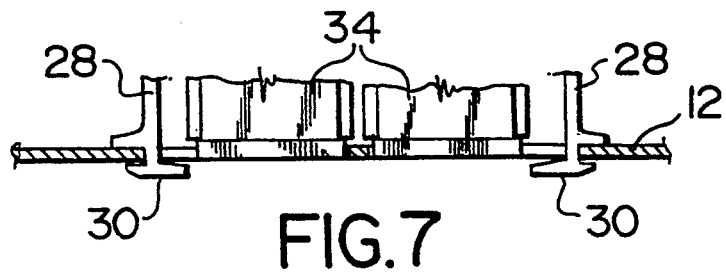
FIG. 7 is a cross sectional view of the part of the panel taken along the line VII—VII in FIG. 6.

Each modular jack connector 34 extends from the printed circuit board 32, to a position such that the front surface of the modular jack connector 34 is aligned with the slots 33 of the mount 18. During mounting of the module 24 onto the panel 12, the modular jack connectors are received by their respective apertures 16a or 16b, the apertures being of such size as to comfortably receive the connector and prevent movement of the modular jack connectors 34 (FIG. 7) in the plane of the panel 12.

In the assembled condition the front face of each modular jack connector 34 is substantially flush with the front surface of the panel 12. In this condition the panel 12 then inhibits removal of the assembly 20, of connector and carrying means from the mount 18 by obstructing movement of the modular jack connectors 34 and hence movement of the PCB 32 within the guide channels 24. In addition, the module is stabilized in all planes upon the panel 12 with a rear surface on the panel abutting the surface 37 of the mount.

The embodiment has the particular practical advantage that customers may order panels 12 having a predetermined number of available positions 16 for receiving modules 14. As many mount and connector modules 14 are assembled onto the panel 12 as are needed for a particular customer's wiring system needs.

In the event that a modular jack connector 34 fails on a patch panel 10, the complete patch panel 10 need not be returned to a supplier for repair and therefore a replacement patch panel does not have to be installed in its place. Should a modular jack connector 34 for example malfunction, an on site technician firstly removes the respective module 14 from the panel 12 by easy operation of the latches, thereby enabling the mount 18 and the assembly 20 of connectors and carrying means to be easily detached one from the other. The faulty connector may then be quickly replaced by simply inserting a new assembly 20 into a mount 18 to provide a new module 14 and then inserting this module into its respective position 16 within the panel 12. Wiring connections to connectors can quickly be made on site and the patch panel 10 returned to service.

In a modification of the embodiment (not shown) a patch panel has only a single position for receiving a mount. The single mount may support an assembly of connector and carrying means having more connectors than in the above embodiment and wherein the mount extends substantially the whole length of the panel. In case of connector failure the assembly of connector and carrying means is simply removed from the panel and replaced.

I claim:

1. A patch panel comprising:
    an assembly of at least one connector and a printed circuit board with the connector being mounted upon the printed circuit board;
    a mount for removably supporting the assembly of at least one connector and printed circuit board in a desired location relative to the mount, and wherein the mount is substantially 'U' shaped having two opposed arms extending from a base and having guide means comprising a guide disposed on each of the two opposing arms of the 'U' shaped mount for receiving the assembly of connector and printed circuit board during its movement into its desired location, the mount having latch means disposed on the arms; and
    a panel for detachably holding the mount in a predetermined position to the panel with the latch means engaging the panel and wherein the panel obstructs the assembly of connector and printed circuit board to prevent removal of the assembly of at least one connector and printed circuit board from the mount when the mount supporting the assembly is held to the panel in the predetermined position.

2. A patch panel as claimed in claim 1 wherein the printed circuit board has two sides, a connector being mounted on each of the sides and the connectors being electrically interconnected.

3. A patch panel comprising;
    an assembly of at least one connector and a printed circuit board with the connector being mounted upon the printed circuit board;
    a mount for removably supporting the assembly of at least one connector and printed circuit board in a desired location relative to the mount; and
    a panel for detachably holding the mount in a predetermined position to the panel and wherein the connector engages the panel to prevent removal of the assembly of connector and printed circuit board from the mount when the mount including the assembly is held to the panel in the predetermined position.

4. A patch panel as claimed in claim 3 wherein latch means is provided which co-acts between the mount and the panel for detachably holding the mount to the panel.

5. A patch panel as claimed in claim 3 wherein the mount includes guide means for receiving the assembly of connector and printed circuit board to allow the assembly to move into its desired location.

6. A patch panel as claimed in claim 5 wherein the mount is substantially 'U' shaped having two opposed arms extending from a base and the guide means comprises a guide disposed on each of the two opposing arms of the 'U' shaped mount.

7. A patch panel as claimed in claim 5 wherein the panel has a predetermined number of positions, each position for detachably holding a mount.

8. A patch panel as claimed in claim 7 wherein the mount is substantially 'U' shaped having two opposed arms extending from a base and the guide means comprises a guide disposed on each of the two opposing arms of the 'U' shaped mount.

9. A patch panel comprising;

an assembly of at least one connector and a printed circuit board with the connector being mounted upon the printed circuit board;

a mount for removably supporting the assembly of at least one connector and printed circuit board in a desired location relative to the mount, the mount being substantially 'U' shaped, having two opposed arms extending from a base and having guide means comprising a guide disposed on each of the two opposing arms of the 'U' shaped mount for receiving the assembly of Connector and printed circuit board during its movement into its desired location and wherein the mount has latch means disposed on the arms a panel having a predetermined number of positions, each position for detachably holding a mount in a predetermined position to the panel with the latch means of the mount engaging the panel, and wherein the panel obstructs the assembly of connector and printed circuit board to prevent removal of the assembly of at least one connector and printed circuit board from the mount when the mount supporting the assembly is held to the panel in the predetermined position.

* * * * *